United States Patent [19]

Kataoka et al.

[11] Patent Number: 5,578,819
[45] Date of Patent: Nov. 26, 1996

[54] OPTICAL RECORDER HAVING A SIGNAL SEPARATION CIRCUIT AND A FIFO MEMORY CIRCUIT

[75] Inventors: Keiji Kataoka; Susumu Saito; Shuuho Yokokawa; Satoshi Aita; Muneyoshi Akai; Shigeo Nemoto; Isao Nakajima; Hitomi Shimizu; Kunitomo Takahashi; Youji Hirose, all of Ibaraki, Japan

[73] Assignee: Hitachi Koki Co., Ltd., Tokyo, Japan

[21] Appl. No.: 493,556

[22] Filed: Jun. 22, 1995

[30] Foreign Application Priority Data

Jun. 30, 1994 [JP] Japan ................................. 6-149347

[51] Int. Cl.⁶ ........................................... H01J 3/14
[52] U.S. Cl. ...................... 250/235; 250/205; 347/135; 369/44.37
[58] Field of Search ....................... 250/235, 205, 250/214 C, 214.1, 208.1; 369/44.37, 44.38, 44.24, 106, 109, 111, 121, 116, 117, 122; 347/135, 234, 237, 241, 247; 358/409, 480; 372/38, 31; 327/514

[56] References Cited

U.S. PATENT DOCUMENTS 4,710,779 12/1987 Funaki et al. ........................ 250/205
5,040,163 8/1991 Sasaki et al. ........................ 250/205

FOREIGN PATENT DOCUMENTS 60-33019 7/1985 Japan .

Primary Examiner—Que T. Le
Attorney, Agent, or Firm—Sughrue, Mion, Zinn, Macpeak & Seas

[57] ABSTRACT

A simple optical recorder which permits alignment of scanning positions of a plurality of laser beams with high accuracy and effects optical recording using the laser beams. The optical recorder is provided with a photosensitive drum which is scanned by a plurality of laser beams formed in rows at an inclined angle with respect to the direction of scan, a single photosensor for sensing each of the sweep positions of the laser beams, and a controller for controlling the scanning positions of the laser beams on the basis of a sensing result of the sensor. The controller is made up of an optical sensing signal separation circuit, synchronous clock generation circuits, FIFO memory circuit elements, and OR circuits.

4 Claims, 6 Drawing Sheets

5,578,819

OPTICAL RECORDER HAVING A SIGNAL SEPARATION CIRCUIT AND A FIFO MEMORY CIRCUIT

BACKGROUND OF THE INVENTION

1. Field of the Invention

This invention relates to an optical recorder in which optical recording is carried out by means of a plurality of laser beams.

2. Description of the Related Art

An optical recorder which effects optical recording by scanning by a plurality of laser beams is well known such as disclosed in Examined Japanese Patent Publication. No. Sho 60-33019. A general optical recorder of this type will be explained with reference to FIG. 1. A plurality of laser beams 43 emitted from a semiconductor laser array 41 are reflected from a polygon mirror 44 into rows of minute optical spots 48, and these optical spots 48 are simultaneously swept over a photosensitive drum 47. In the drawings, reference numerals 42 and 45 designate lenses. A photosensor 46, provided in the vicinity of the end of the photosensitive drum 47, detects the positions of the plurality of laser beams 43, which are to be swept at one time, in the direction of scan. The position of scanning is controlled by means of a controller 49 using the sensing signal as a synchronous signal.

Intervals between the rows of optical spots 48 are usually larger than required scanning line pitch, and hence it is necessary to arrange the optical spots 48 in rows on the photosensitive drum 47 at an inclined angle with respect to the scan direction. This makes the scanning intervals of the optical spots equal to the scanning line pitch. In this way, it is possible to adjust the scanning line pitch by changing the inclined angle of the optical spots 48 in rows.

However, in this type of system wherein the rows of the optical spot are set at an inclined angle with respect to the scan direction, the plurality of laser beams to be simultaneously swept respectively have different positions in the scan direction. For this reason, a complex controller is required to effect optical recording by correcting the scanning positions of the laser beams and aligning the scanning positions with high accuracy.

SUMMARY OF THE INVENTION

In view of the foregoing descriptions, an object of the present invention is to provide a simple optical recorder which permits scanning positions of a plurality of laser beams to be aligned with high accuracy, and carries out optical recording using the laser beams.

According to one aspect of the present invention, this object is achieved by an optical recorder, comprising: a photosensitive member; means for generating a plurality of laser beams, said plurality of laser beams being formed into rows; means for scanning said photosensitive member by said plurality of laser beams, said plurality of laser beams being arranged at an inclined angle with respect to a scanning direction; means for detecting the respective scanning positions of said plurality of laser beams; control means for controlling the scanning positions of said plurality of laser beams on the basis of a detection result from said detecting means; an optical sensing signal separation circuit for separating a set of signals generated in time series order by the laser beams emitted from said detecting means into signals respectively corresponding to the laser beams; a synchronous clock generation circuit for generating synchronous clocks in response to the respective separated signals; a first-in-first-out memory circuit element which temporarily stores data signals for effecting optical recording corresponding to each of the laser beams and outputs the data signals in the order in which the data signals were stored in synchronism with a corresponding synchronous clock; and an OR circuit for subjecting to an OR operation each of the data signals output from said first-in-first-out memory circuit element and a signal used for irradiating said detecting means with light.

By virtue of this configuration, it is possible to easily align the scanning positions of the plurality of laser beams with high accuracy when the plurality of laser beams, arranged at an inclined angle with respect to the direction of scan, are swept over the photosensitive member.

By virtue of the present invention, it is possible to easily and precisely eliminate inaccuracy in positions of optical recording in the scan direction caused as a result of the scanning of a plurality of laser beams, being formed into rows and arranged at an inclined angle with respect to the direction of scan, over a photosensitive member.

DETAILED DESCRIPTION OF THE PREFERRED EMBODIMENT

Figure 1:
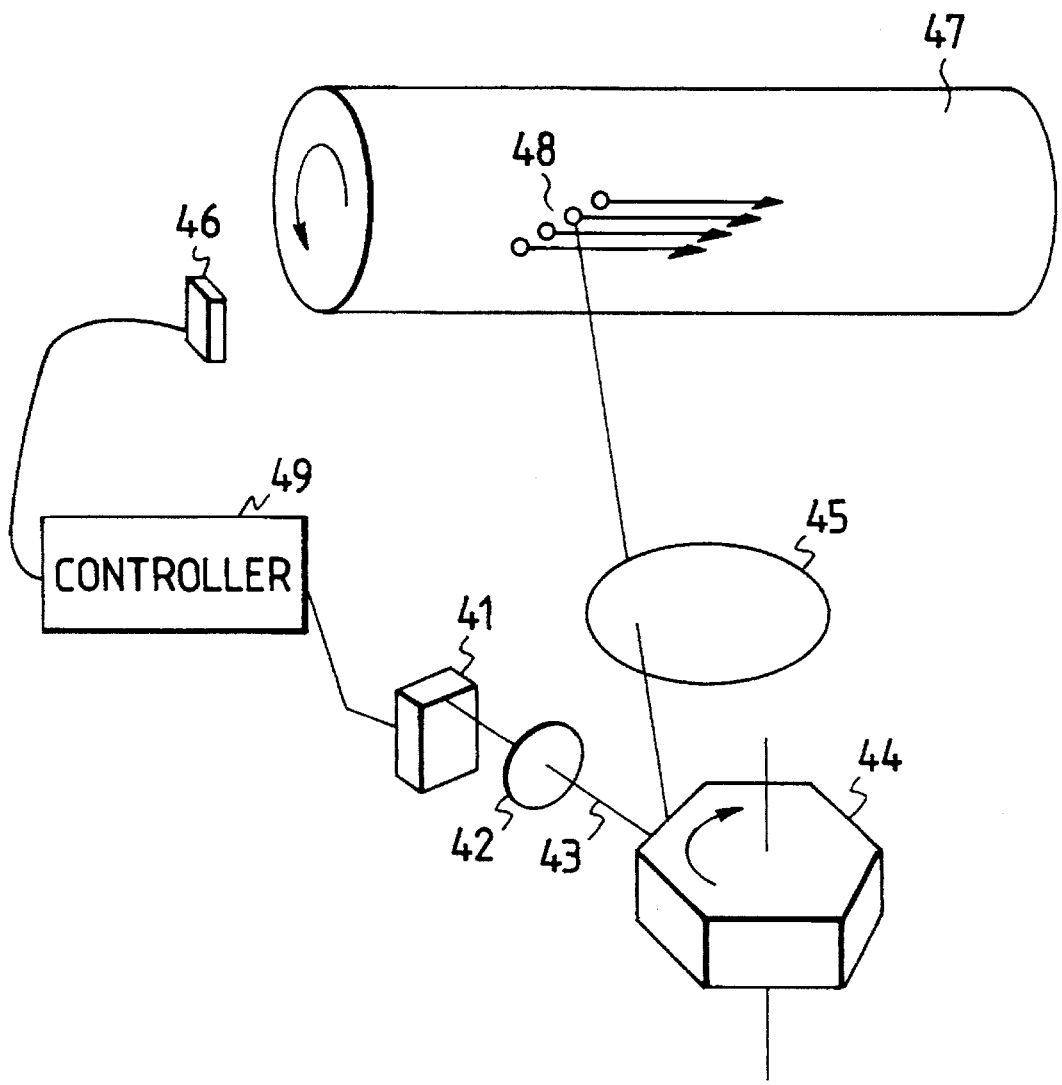
FIG. 1 is a schematic representation showing the configuration of a conventional optical recorder.
Figure 2:
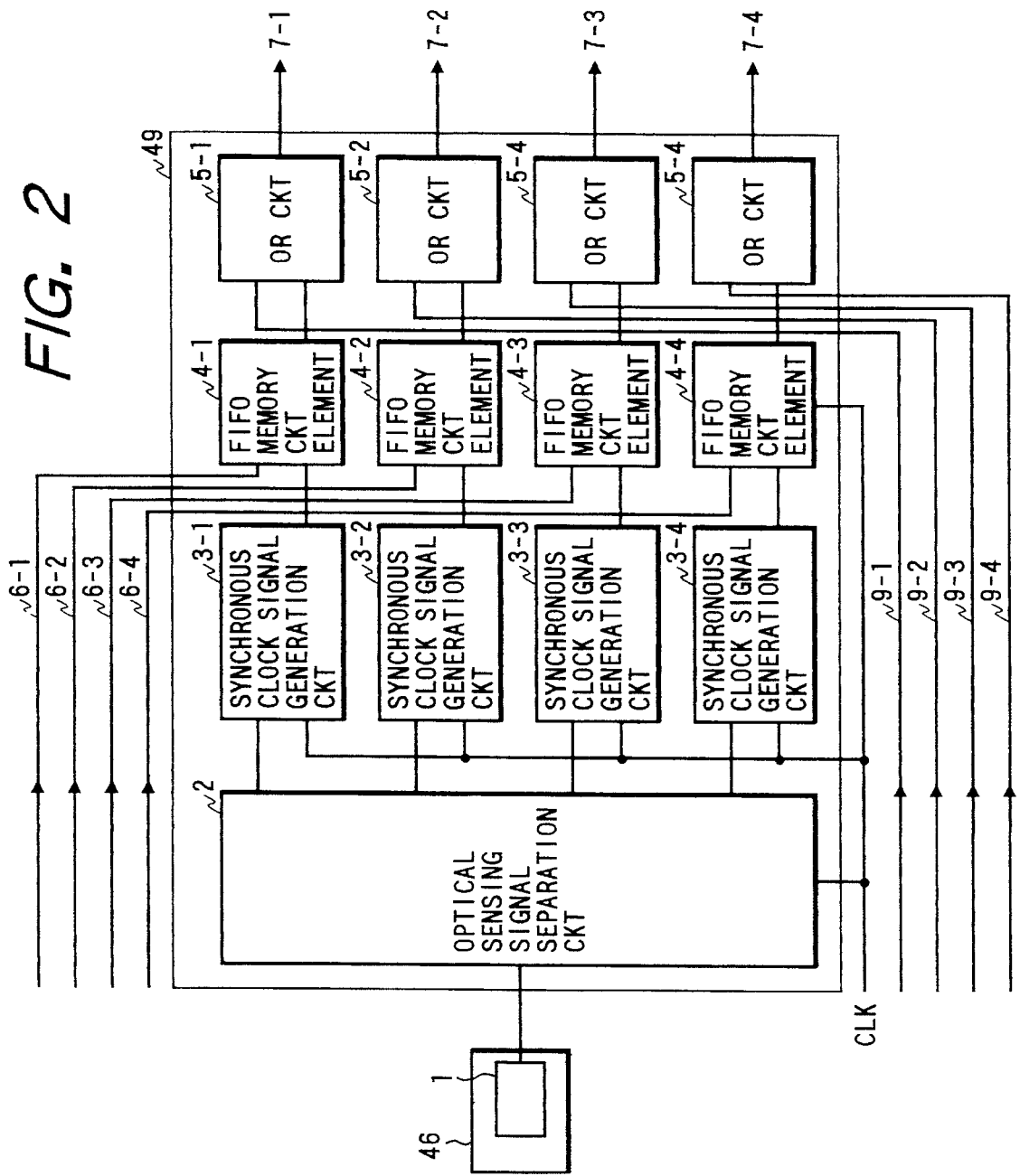
FIG. 2 is a block diagram showing a controller of an optical recorder in one embodiment of the present invention.
Figure 3:
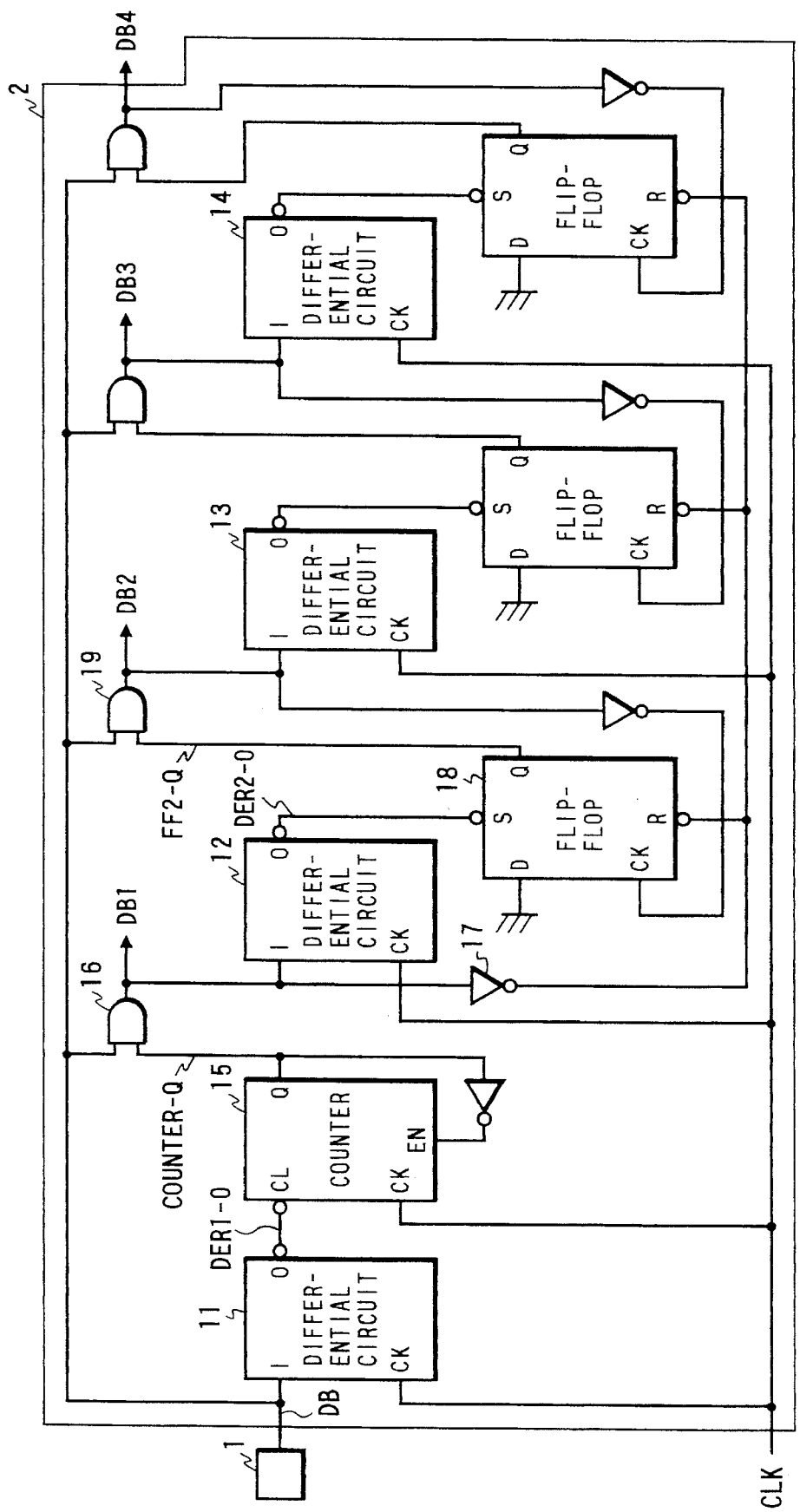
FIG. 3 is a circuit diagram showing an optical sensing signal separation circuit.
Figure 4:
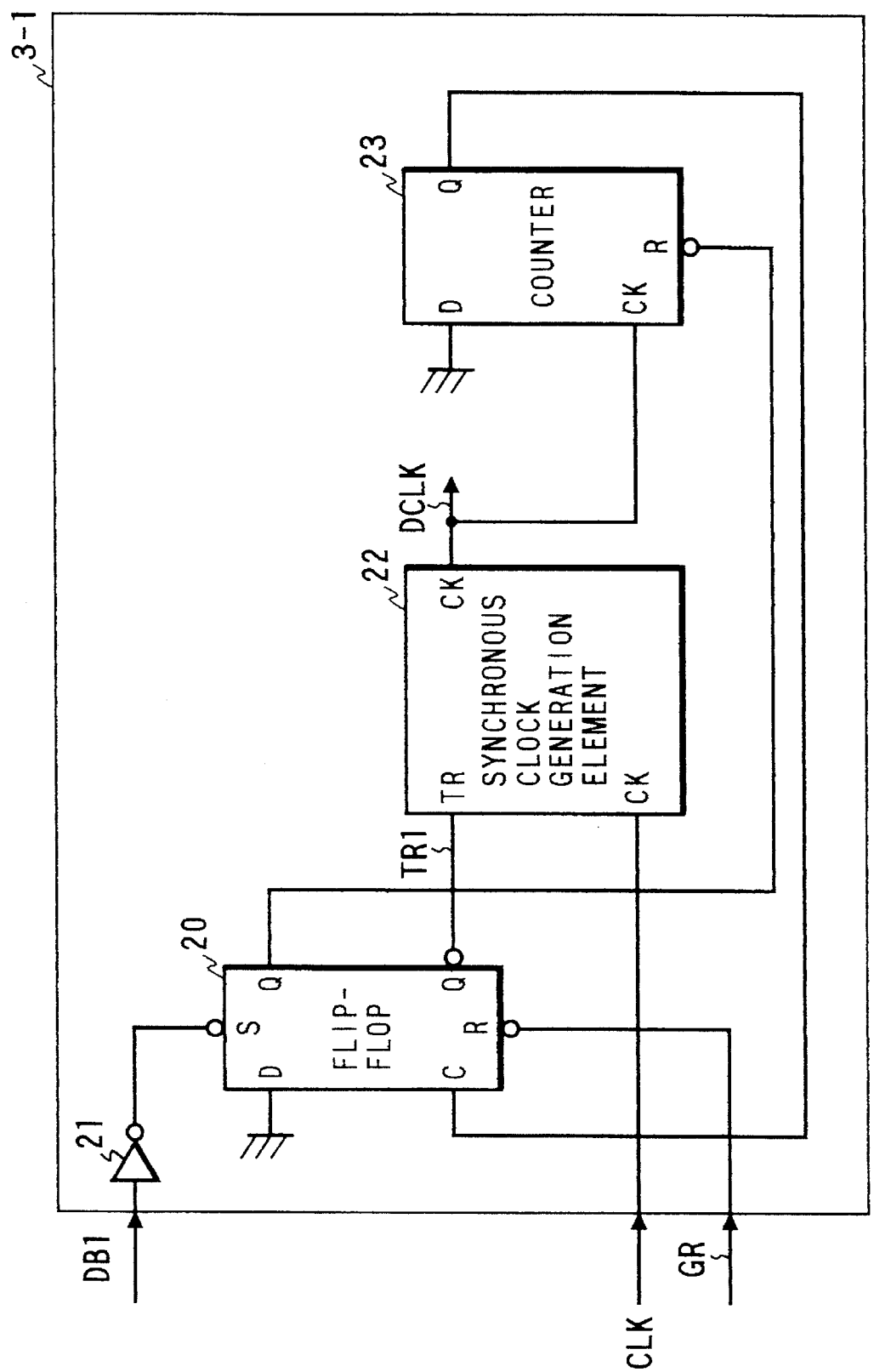
FIG. 4 is a circuit diagram showing a synchronous clock generation circuit.
Figure 5:
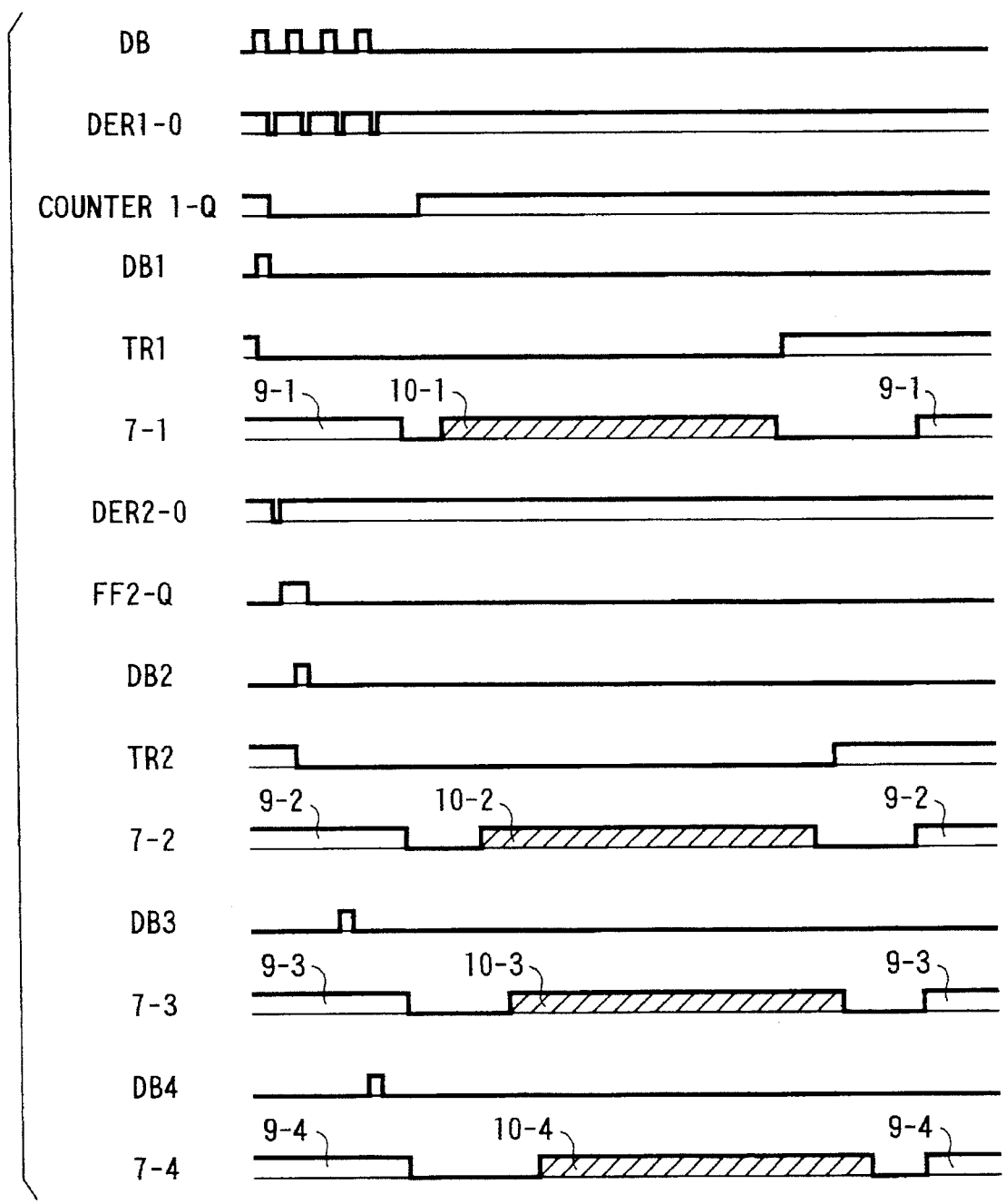
FIG. 5 is a timing chart of the entire controller.
Figure 6:
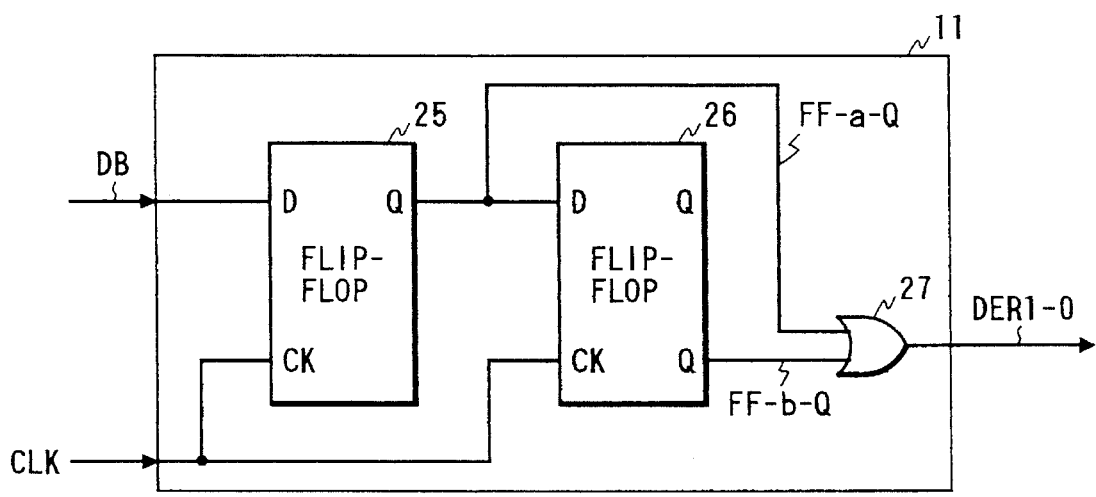
FIG. 6 is a circuit diagram showing a differential circuit in an optical sensing signal separation circuit.
Figure 7:
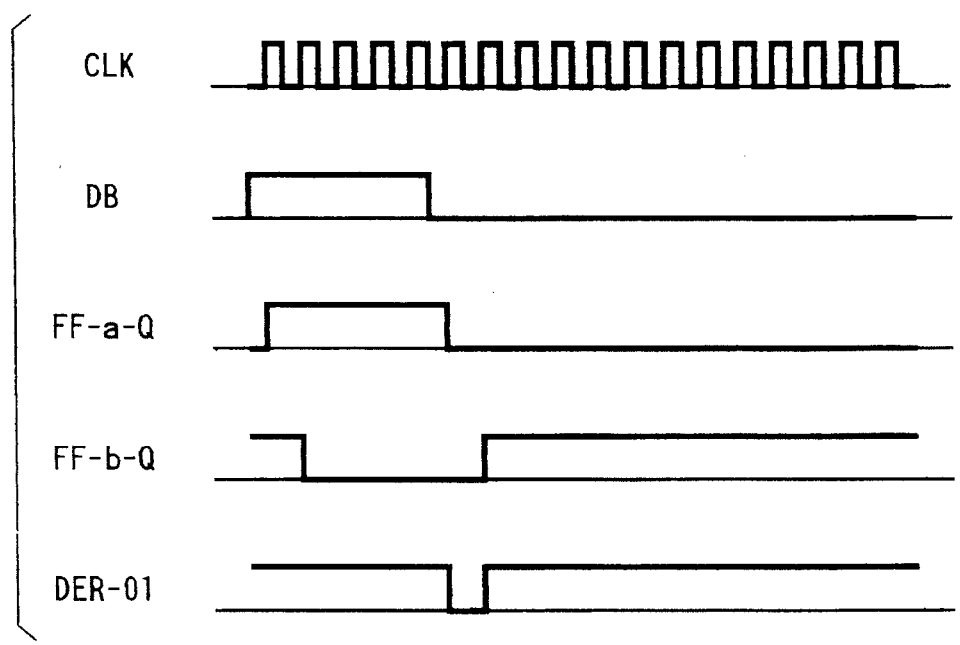
FIG. 7 is a timing chart of the differential circuit.

Referring to the accompanying drawings, an optical recorder in one embodiment of the present invention will now be described in detail hereunder. Here, an explanation will be given of an optical recorder using four laser beams. FIG. 2 shows a controller of an optical recorder according to this invention. This optical recorder is identical with the optical recorder shown in FIG. 1 except the controller 49, and hence the explanation thereof will be omitted here for brevity. In place of a semiconductor array 41 shown in FIG. 1, a laser beam emanated from a single laser light source may be split into a plurality of laser beams. The controller 49 is made up of an optical sensing signal separation circuit 2, synchronous clock signal generation circuits 3-1 to 3-4, FIFO memory circuit elements 4-1 to 4-3, and OR circuits 5-1 to 5-4. In the drawing, an optical sensing circuit 1 is housed in a photosensor 46 shown in FIG. 1. FIG. 3 is a circuit diagram showing the optical sensing signal separation circuit 2; FIG. 4 is a circuit diagram showing the synchronous clock generation circuits 3-1 to 3-4; FIG. 5 is a timing chart of the entire controller 49; FIG. 6 is a circuit diagram showing differential circuits 11 to 14 provided in the optical sensing signal separation circuit 2; and FIG. 7 is a timing chart of the differential circuit 11.

The operation of the controller 49 will now be described. As shown in FIG. 5, the optical sensing circuit 1 outputs the number of composite optical sensing signals DB corresponding to the number of laser beams, and the thus outputted DB signals are received by the optical sensing signal separation circuit 2. The optical sensing signal separation circuit 2 outputs optical sensing signals DB1–DB4 respectively corresponding to the laser beams from the composite optical sensing signals DB. Throughout the drawing, CLK designates a clock signal.

Referring to FIG. 3, the optical sensing signal separation circuit 2 will be described in detail. The composite optical sensing signals DB are first inputted into the differential circuit 11. The differential circuit 11 will be explained in detail with reference to FIGS. 6 and 7. The differential circuits 12 to 14 have the same circuit configuration as the differential circuit 11. In FIG. 6, each of reference numerals 25 and 26 designates a flip-flop circuit, and reference numeral 27 designates an OR circuit. The composite optical sensing signals DB are received by the flip-flop circuit 25, and an output FF-a-Q from the flip-flop circuit 25 enters the flip-flop circuit 26 and the OR circuit 27. FIG. 7 shows respective signals in this differential circuit 11, and signal pulses DER1-0 develop in the vicinity of trailing edges of the composite optical sensing signals DB.

Referring back to FIG. 3, the signal pulse DER1-0 enters a counter 15, and an output COUNTER1-Q from the counter 15 and the composite optical sensing signals DB are inputted into an AND circuit 16. The AND circuit 16 then outputs a signal DB1 which is one of optical sensing signals separated from the composite optical sensing signals DB.

The generation of the next signal DB2 which will be separated from the composite optical sensing signals DB will be explained hereunder. The signal DB1 enters a reset terminal R of a flip-flop circuit 18 via the differential circuit 12 and an inverter 17. The differential circuit 12 causes a signal pulse DER2-0 to develop in the vicinity of the trailing edge of the signal DB1. The signal pulse DER2-0 enters a set terminal S of the flip-flop circuit 18, and an output FF2-Q from the flip-flop circuit 18 enters an AND circuit 19 together with the composite optical sensing signals DB. The AND circuit 19 outputs the signal DB2 which is one of the optical sensing signals separated from the composite optical sensing signals DB.

Similarly, it is also possible to obtain subsequent signals DB3 and DB4 which will be separated from the composite optical sensing signals DB.

The separated optical sensing signals DB1–DB4 respectively enter the synchronous clock generation circuits 3-1 to 3-4. Referring to FIG. 4, the synchronous clock generation circuits 3-1 to 3-4 will be described in detail. In FIG. 4, a signal GR enters a reset terminal R of a flip-flop circuit 20. When the circuit is powered up, the flip-flop circuit 20 is reset. The separated optical sensing signal DB1 enters a set terminal S of the flip-flop circuit 20 via an inverter 21, and an output signal TR1 from the flip-flop circuit 20 enters a synchronous clock generation element 22. Upon receipt of the optical sensing signal DB1, the flip-flop circuit 20 outputs the signal TR1. Then, the synchronous clock generation element 22 outputs a synchronous clock signal DCLK in synchronism with the fall of the signal TR1 from a high level to a low level. The synchronous clock signal DCLK is different in phase from, but is identical in cycle with, the clock signal CLK. The synchronous clock signal DCLK enters FIFO memory circuit elements which will be described later and a clock terminal CK of a counter 23.

After the synchronous clock DCLK has been counted to a predetermined number by means of the counter 23, the signal TR1 returns to a high level, and the generation of the synchronous clock signal DCLK is completed. These synchronous clock generation circuits 3-1 to 3-4 can output a clock input signal in synchronism with a trigger input, and an IC, for example, M66235 produced by MITSUBISHI Co., Ltd. can be employed as these synchronous clock generation circuits.

The synchronous clock signals DCLK respectively produced by the synchronous clock generation circuits 3-1 to 3-4 enter corresponding FIFO memory circuit elements 4-1 to 4-4. FIFO memory circuit is an abbreviation for First-in First-out, and it is possible for a FIFO memory circuit element to temporarily store input data and output the data in the order in which they were inputted. Data signals 6-1 to 6-4 which are to be optically recorded by a plurality of laser beams are transmitted to the FIFO memory circuit elements 4-1 to 4-4 in synchronism with the clock signal CLK, and the data signals are then temporarily stored. In the FIFO memory circuit elements 4-1 to 4-4, data signals 6-1 to 6-4 sequentially stored in synchronism with the clock signal CLK are read in synchronism with the synchronous clock signal DCLK in the order in which the data signals were stored.

The data signals output from the FIFO memory circuit elements 4-1 to 4-4 in synchronism with the synchronous clock DCLK enter the OR circuits 5-1 to 5-4 together with signals 9-1 to 9-4 used for irradiating the photosensor 46 with laser beams, and they are subjected to OR operation.

Optically modulated signals 7-1 to 7-4 outputted from the OR circuits 5-1 to 5-4 enter corresponding optical modulation means, for example, each of laser elements constituting a semiconductor array, an acousto-optical modulator, or the like.

In FIG. 5, the portions 10-1 to 10-4 of the optically modulated signals 7-1 to 7-4 are data signals in synchronism with the synchronous clock signals DCLK, and these signals are respectively in synchronism with the optical sensing signals constituting the composite optical sensing signals DB. These data signals are practically used in optical recording.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. An optical recorder, comprising:

a photosensitive member;

means for generating a plurality of laser beams, said plurality of laser beams being formed into rows;

means for scanning said photosensitive member by said plurality of laser beams, said plurality of laser beams being arranged at an inclined angle with respect to a scanning direction;

means for detecting the respective scanning positions of said plurality of laser beams;

control means for controlling the scanning positions of said plurality of laser beams on the basis of a detection result from said detecting means;

an optical sensing signal separation circuit for separating a set of signals generated in time series order by the laser beams detected by said detecting means into signals respectively corresponding to the laser beams;

a synchronous clock generation circuit for generating synchronous clocks in response to the respective separated signals;

a first-in-first-out memory circuit element which temporarily stores data signals for effecting optical recording corresponding to each of the laser beams and outputs the data signals in the order in which the data signals were stored in synchronism with a corresponding synchronous clock; and an OR circuit for subjecting to an OR operation each of the data signals output from said first-in-first-out memory circuit element and each of signals used for irradiating said detecting means with said laser beams.

2. An optical recorder as claimed in claim 1, wherein said detecting means comprises a signal photosensor.

3. An optical recorder as claimed in claim 1, wherein said laser beam generating means comprises a semiconductor laser array.

4. An optical recorder as claimed in claim 1, wherein said laser beam generating means comprises a single laser source and means for dividing a laser beam emitted from said laser source into a plurality of laser beams.

* * * * *